United States Patent [19]
Bassett

[11] Patent Number: 5,346,136
[45] Date of Patent: Sep. 13, 1994

[54] FUEL INJECTION VALVE

[75] Inventor: H. Eugene Bassett, Houston, Tex.

[73] Assignee: Dover Resources, Inc., Tulsa, Okla.

[21] Appl. No.: 135,074

[22] Filed: Oct. 12, 1993

[51] Int. Cl.$^5$ ............................................... B05B 1/30
[52] U.S. Cl. ............................... 239/533.2; 239/600;
277/59; 277/124
[58] Field of Search ............... 239/88, 533.2–533.12,
239/600; 277/59, 62, 71, 72, 79, 124

[56] References Cited

U.S. PATENT DOCUMENTS

| | | |
|---|---|---|
| 2,155,628 | 4/1939 | Williams . |
| 2,210,826 | 8/1940 | Williams ............................... 277/62 |
| 2,504,936 | 4/1950 | Payne ................................... 277/62 |
| 3,319,647 | 5/1967 | Morain . |
| 3,827,700 | 8/1974 | Kaller ................................... 277/59 |
| 3,834,715 | 9/1974 | Butler ................................... 277/59 |
| 3,907,307 | 9/1975 | Maurer et al. ....................... 277/71 |
| 3,979,104 | 9/1976 | LaCoste et al. . |
| 4,222,575 | 9/1980 | Sekiguchi et al. .................. 277/59 |
| 4,364,542 | 12/1982 | Meyer ................................. 277/124 |
| 4,365,756 | 12/1982 | Fisher . |
| 4,428,584 | 1/1984 | Shapiro . |
| 4,531,537 | 7/1985 | Smith ................................... 277/59 |
| 4,886,241 | 12/1989 | Davis et al. . |
| 5,056,757 | 10/1991 | Wood . |
| 5,056,758 | 10/1991 | Bramblet ............................ 277/124 |
| 5,106,023 | 4/1992 | Bentley et al. .................... 239/533.2 |
| 5,129,625 | 7/1992 | Wood et al. . |

FOREIGN PATENT DOCUMENTS 1021812 2/1953 France ............................. 277/59
WO921776 10/1992 PCT Int'l Appl. .

OTHER PUBLICATIONS

"Automated Compressor-Packing System Meets California Emissions Reg", *Oil and Gas Journal*, Jul. 6, 1992, PenWell Publishing Company.
"Pistons, Rods, Rings Respond to Loading", *Plant Services*, Jul. 1992, pp. 52–54.

Primary Examiner—Andres Kashnikow
Assistant Examiner—Christopher G. Trainor
Attorney, Agent, or Firm—Browning, Bushman, Anderson & Brookhart

[57] ABSTRACT

A fuel injection valve for an engine comprises a tubular housing having a central throughway. An axially directed valve seat defines an outlet from the throughway. At least one housing fuel inlet communicates the exterior of the housing with the throughway outwardly of the seat. A sealing section outwardly of the housing fuel inlet includes an internal annular enlargement in the central throughway. A housing buffer inlet communicates the exterior of the housing with the enlargement. An inert, nonflammable buffer gas is injected through the housing buffer inlet. A valve stem is mounted for reciprocation in the throughway and has a valve element for cooperation with the seat. First and second annular housing seals are disposed between the valve stem and the housing, respectively inwardly and outwardly of the downstream end of the housing buffer inlet.

22 Claims, 2 Drawing Sheets

FUEL INJECTION VALVE

BACKGROUND OF THE INVENTION

1. Field of the Invention

For both environmental and industrial hygiene reasons, there is increasing concern about emissions from engines and other industrial apparatus, and the regulations concerning such emissions are becoming increasingly strict. Realistically, it is necessary to attempt to design or modify such apparatus so that, in normal operation, it will emit no hazardous fluids. Where the fluid is a gas, there is particular concern, since, once emitted, the gas is much more difficult—often impossible—to contain and recover.

Engines that use natural gas as fuel are often used where natural gas is readily available. For example, they are often used to run compressors associated with natural gas pipelines. It is much more efficient to use the natural gas at hand as fuel, rather than bringing in some other form of fuel. Many such engines were put into service when natural gas emissions were of little or no concern. Now, however, natural gas emissions are of concern, particularly in environmentally sensitive areas such as California. It is desirable to find a simple way to make engines already in the field comply with stricter regulations, so that they need not be replaced. To the extent that new engines are put into service, it is desirable to minimize the amount of redesign and retooling necessary to meet current emissions standards.

Among the main potential leak points in such an engine are the fuel injection valves. If emissions from such valves can be controlled, little or no engine redesign or modification may be necessary. It is, in turn, desirable to modify existing valve technology as simply and inexpensively as possible.

2. Description of the Prior Art

Much different types of valves, e.g. butterfly valves that open and close conduits, have been designed so that an inert buffer gas can be injected into a potential leak space at a pressure greater than that being sealed against. By virtue of this higher pressure, the buffer gas may leak into the vessel or process, rather than leakage occurring in the opposite direction. Any gas that leaks to the atmosphere will be buffer gas, which is chosen so as to be harmless. Examples are found in U.S. Pat. No. 3,979,104 to LaCoste et al. and WIPO Publication No. W092/16776 to Calvin.

The structures of these valves are very different from that of a fuel injection valve. Furthermore, the seal structures do not experience the same kind of service. A butterfly valve for a conduit is opened or closed relatively infrequently. In an engine, there is a reciprocal stroke of the valve stem of each fuel injection valve for every firing of the corresponding cylinder. Thus, these stems are constantly and rapidly reciprocating in use, and sealing is required about the circumference of such stems. Mechanical seals can develop small leaks very rapidly in such service.

It has also been known to use buffer fluids in the seal areas about piston rods, as discussed in "Automated Compressor-packing System Meets California Emissions Reg," *Oil and Gas Journal,* Jul. 6, 1992, PennWell Publishing Company, and in "Pistons, Rods, Rings Respond to Loading," *Plant Services,* July 1992. Although piston rods do reciprocate rapidly, the structural differences between this general type of apparatus and that of a fuel injection valve are, perhaps, even greater than that between butterfly valves and fuel injection valves.

That is particularly true of a particular type of fuel injection valve, which has even greater structural dissimilarity from the above art, but which has become increasingly popular for natural gas engines. Specifically, this is a type that includes an outer housing or "cage" that at least partially receives and surrounds an inner housing. It is the inner housing that carries the valve seat and in which the valve stem and element work. Valves of this type have been sold for many years under the trademark "Rebecca." An example is illustrated in U.S. Pat. No. 4,365,756 to Fisher. In other versions, chevron seals have been used.

While offering many advantages over older single housing designs, these dual housing valves present even greater challenges in terms of sealing. In addition to the locus between the valve stem and the housing ID, there is now a second annular locus, between the two housings, that must also be sealed. In many of the dual housing valves, it would be a particular difficulty to use a buffer gas in both of these loci. If it could be done at all, it might require separate gas injectors for the two loci, respectively, and/or the need for a complicated system of flow passages for the buffer gas.

U.S. Pat. No. 3,319,647 to Morain discloses an exhaust valve for an expansion type engine that handles extremely cold (cryogenic) fluids. This design does illustrate a system of passages communicating with two annular loci. However, these passages are not designed to inject a buffer gas (or anything else), but rather to allow cold fluid that does leak to enter a stagnation zone. The reason for this is understood to be that any fluid that contacts the outermost seals will not be so cold, and will therefore be less likely to interfere with the mechanical seals' effectiveness.

In other words, Morain seems to simply accept the idea that there is no way to prevent some leakage outwardly from the engine, and contents himself with trying to attenuate the ill effects of cold temperatures on the mechanical seal. Not only would his approach not work in the context of more typical engines, but even his structure would be unsuitable for adaptation to that service. By way of example, many of his seals are not fluid pressure responsive. The only seal arguably provided axially inwardly of the radially outermost annular locus is simply the face-to-face contact between two axially abutting parts 10 and 36 of the housing in question, and this would more likely leak to atmosphere to an unacceptable degree if fluid were injected at a pressure even higher than that in the engine.

The upshot of all this is that, to the present inventor's knowledge, no prior fuel injection valves, especially for natural gas engines, have been provided with buffer gas systems. The rather primitive "state of the art" for dealing with fugitive emissions in this art is for a person to frequently pass a detector known as a "sniffer" about the likely leak points of an engine. If a leak is thus detected, the system is depressurized and shut down, and the seals are replaced. Not only is the monitoring expensive, time-consuming and bothersome, but given current seal systems, the seals of many valves do develop leaks and require replacement relatively often, resulting in further expense, bother, and downtime for the engine.

SUMMARY OF THE INVENTION

The present invention provides an improved fuel injection valve and related methods. Although certain aspects of the invention may be incorporated in various types of fuel injection valves, the invention is particularly well adapted for the type of fuel injection valve that is used in an engine that runs on gaseous fuel such as natural gas.

More specifically, the type of fuel injection valve to which the present invention applies includes a tubular housing having a central throughway. As used herein, "tubular" should be very broadly and generally construed as any item having an open-ended elongate throughway; it need not be straight-sided, either on its interior or exterior surfaces, and it may have appendages, lateral ports or passages, etc.

The housing has an annular, axially directed valve seat defining an outlet from the throughway. By "axially directed" is meant that the seat faces generally in the axial direction, with respect to the throughway, although it may also be inclined axially and radially; in other words, the valve element, described below, may seat and unseat by axial movements.

The housing has at least one fuel inlet therethrough, communicating its exterior with the throughway, outwardly of the valve seat. As used herein, "outwardly" and "inwardly" will refer to the relative positions of things generally along the axis of the throughway, as the valve would be positioned in the engine in use.

The housing also has a sealing section disposed outwardly of the housing fuel inlet and including an internal annular enlargement in the central throughway. An "enlargement" herein will mean that the area in question has a larger diameter than at least one of the axially adjacent areas. A buffer inlet through the housing communicates the exterior of the housing with the aforementioned enlargement, and the invention includes means for communicating a buffer fluid injector with an upstream end of this housing buffer inlet.

The valve further includes a valve stem mounted for reciprocation in the throughway of the housing and having a valve element at its inner end arranged in opposition to the valve seat.

First and second annular housing seal means are sealingly disposed between the valve stem and the housing, respectively inwardly and outwardly of the downstream end of the housing buffer inlet. Thus, if an inert, nonflammable buffer fluid is injected through this port at a pressure greater than the fuel pressure, the innermost one of the housing seals will maintain such a pressure differential between the sealing section and the fuel-containing zone of the housing, in the annular locus between the valve stem and the housing, so that any leakage between these two areas will be leakage of buffer fluid inwardly, rather than leakage of fuel outwardly. Accordingly, the only fluid present in the sealing section should be the buffer fluid.

The outermost one of the housing seals will prevent substantial leakage of the buffer fluid to the atmosphere. However, this is primarily to maintain the necessary pressure differential and prevent excessive loss of buffer fluid, as the buffer fluid itself is harmless. Therefore, any such buffer fluid that does leak out to atmosphere will not be environmentally objectionable. For example, the buffer fluid might be nitrogen gas.

The housing seal means are preferably of a fluid pressure responsive type, and even more preferably, are elastomeric deflectable lip-type seals, such as chevron rings. It has been found somewhat surprisingly, that, even though the buffer fluid pressure may be urging the lips of the seals into even tighter engagement with the rapidly reciprocating parts sealed against, the arrangement of the present invention not only effectively precludes fugitive emissions of environmentally unacceptable gases from the engine, but also the seals themselves now have a longer life, and do not have to be changed as frequently as in otherwise similar valves in the past.

Although the invention can be incorporated in single-housing valves, a particular feature of the present invention is the manner in which it can be incorporated to buffer seal the two annular loci of a dual-housing valve without the need for separate injectors and/or separate upstream injector openings. More specifically, the valve may include a tubular cage coaxially removably receiving at least a portion of the housing. Such a cage will have an open inner end adjacent the valve seat adapted for receipt in a firing chamber of an engine and a fuel inlet disposed inwardly of the sealing section of the housing (when it is received in the cage).

The cage and the housing are sized and configured to define a fuel flow space laterally between the interior surface of the cage and the exterior of the housing, and longitudinally between the fuel inlet of the cage and the fuel inlet of the housing. Thus, fuel can be introduced to the cage, whence it may flow through the flow space, through the fuel inlet of the housing, down through the interior of the housing, and finally be admitted to the firing chamber of the engine through the seat when the valve opens.

A cage buffer inlet extends through the cage, the cage buffer inlet being communicable with the injector and having a downstream end opening to an annular locus between the exterior of the housing and an interior surface of the cage, and disposed outwardly of the cage fuel inlet. At least one of the cage or the housing has an annular distribution groove communicating with the downstream end of the cage buffer inlet and with the upstream end of the housing buffer inlet. First and second annular cage seal means are sealingly disposed between the housing and the cage, respectively inwardly and outwardly of the downstream end of the cage buffer inlet.

Accordingly, buffer fluid injected through the single injector also communicates with the annular locus between the cage and the housing, and axially between the two cage seals, and prevents fugitive emissions of fuel leaking between the cage and the housing, in much the same manner as it does as between the housing and the valve stem.

The distribution groove, like the enlargement in the central throughway of the housing, ensures that the buffer gas is distributed about the entire circumferences of the members being sealed, so as to complete and perfect the buffering function.

In preferred embodiments, the cage has an outer tubular portion that at least partially surrounds the sealing section of the housing, and is thus located outwardly of the fuel inlets (housing and cage). Then, the buffer inlets can be simple radial bores, either aligned, or close enough to alignment, that they both communicate with the distribution groove. The injector may simply be connected to suitable formations, such as threads, in the upstream end of the cage buffer inlet.

In some preferred embodiments of the invention, the enlargement in the central throughway of the housing, in addition to communicating with the downstream end of the housing buffer inlet, also contains the housing seal means. Then, a spacer is provided in the enlargement, between the first and second housing seal means. The spacer should be adapted to permit fluid distribution from the inner diameter of the enlargement to the outer diameter of the valve stem, about the entire circumference. It is particularly advantageous to utilize a compression spring, more specifically a helical coil spring, as this spacer, so that it can also serve to pre-load the seals. Viewing it another way, many valves already have enlargements containing such seal means and pre-loading springs, and the present invention provides a particularly advantageous way of modifying such valves by forming the buffer inlet port such that it communicates with this already existing enlargement. Thus, the existing enlargement is also utilized for buffer fluid distribution, and the existing spring is used as the spacer. As suggested above, this method of the present invention may be further enhanced, in the case of a dual housing valve, by forming the cage buffer inlet as a radial bore through an outer tubular portion of the cage at least partially surrounding the sealing section of the housing.

The invention also comprises a method of sealing a fuel injection valve by injecting an inert, nonflammable gas between the valve stem and the housing, and between two axially spaced housing seals, at a pressure greater than the fuel pressure. In preferred embodiments, the buffer gas is also injected into an annular locus between two housings.

DESCRIPTION OF THE PREFERRED EMBODIMENTS

Figures 1, 1A:
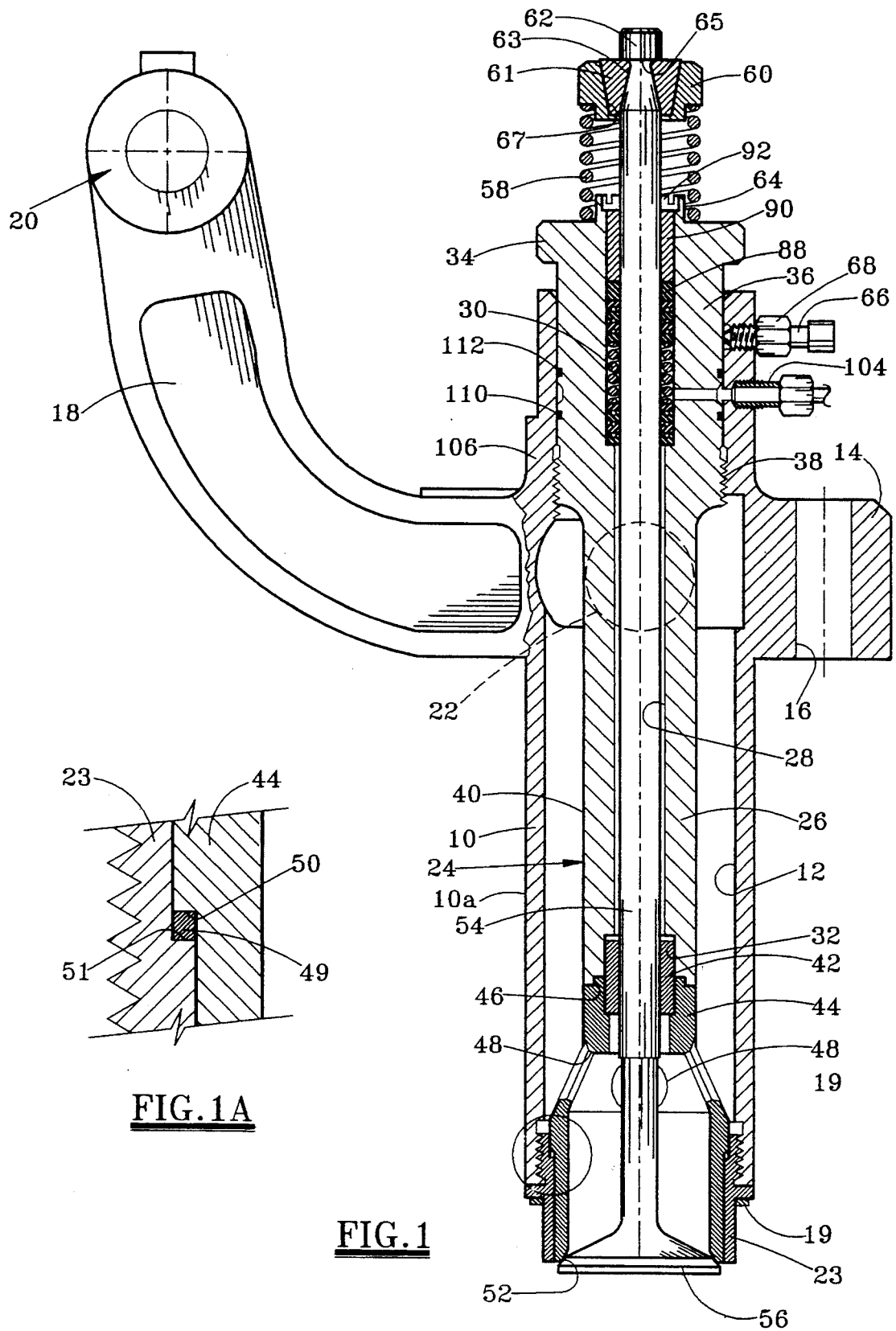
FIG. 1 is a longitudinal cross-sectional view of a fuel injection valve in accord with the present invention.
FIG. 1A is an enlarged detailed view of the area circled at the lower left of FIG. 1.
Figure 2:
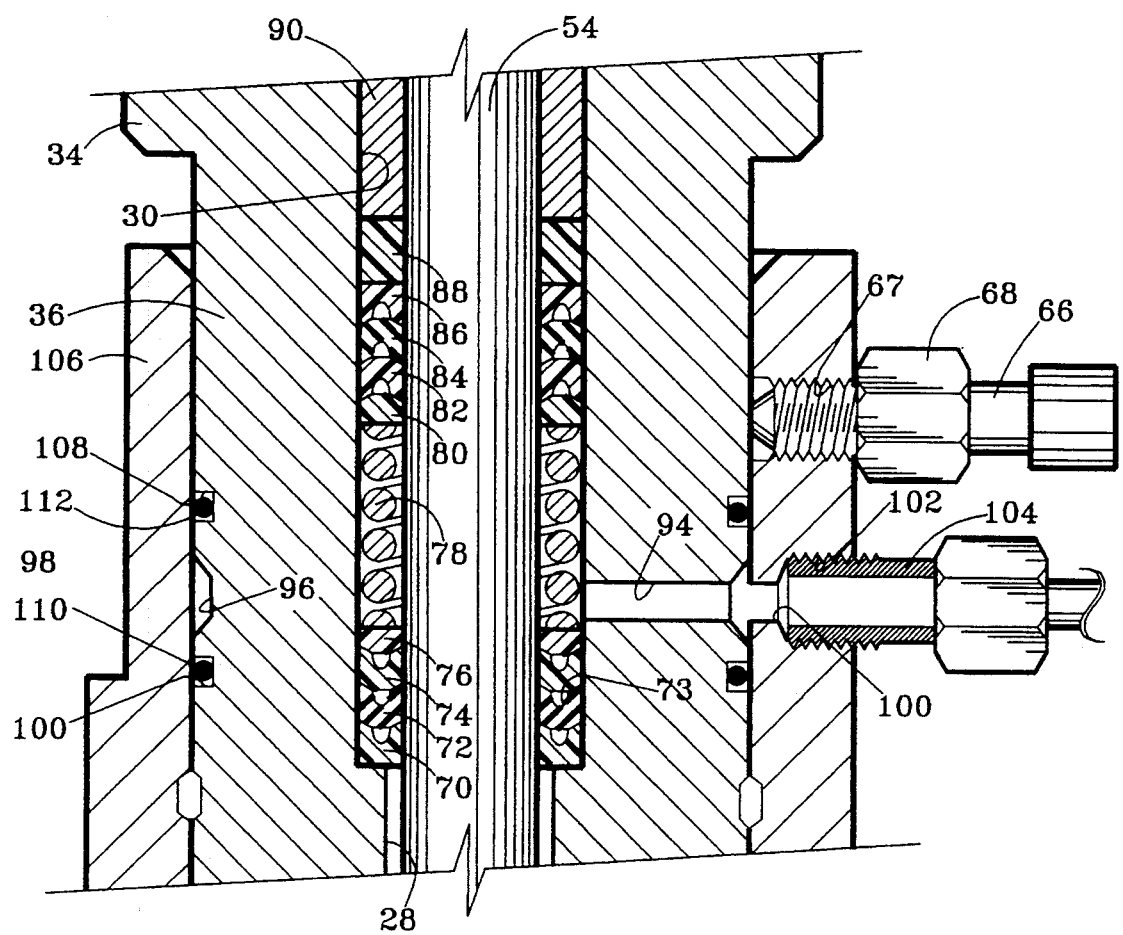
FIG. 2 is an enlarged longitudinal cross-sectional view of the upper portion of the valve, including the sealing section of the housing and the upper tubular portion of the cage.

FIGS. 1 and 2 illustrate a currently preferred fuel injection valve according to the present invention. The valve illustrated is adapted for injecting gaseous fuel, such as natural gas, into a large engine designed to run on such fuel, and is of a type referred to herein as "dual housing." The valve comprises a tubular outer housing or cage 10, which is typically formed as a unitary metal casting, although certain details such as threaded sections may be subsequently machined, or may be formed on a separate piece welded, interference fitted, or otherwise affixed to the main body of the cage, so as to be integral therewith. The main elongate portion of cage 10 defines a central bore 12, open at its upper and lower ends. Intermediate those ends, but preferably somewhat closer to the upper (or outer) end, a series of integral lugs, one of which is shown at 14, extend radially outwardly. Each of these lugs 14 defines a bolt hole 16, for receipt of a respective bolt by which the cage may be attached to the body of the engine. When so attached, the lower tubular portion 10a of the cage will be received in one of the engine firing chambers, typically cylinders, while an upper tubular portion 10b, extending upwardly beyond lugs 14, will be exposed and accessible from the outside of the engine.

An arm 18 formed integrally with the rest of the cage 10 extends radially outwardly from the vicinity of lugs 14 and thence upwardly. At its upper and outer end, there is formed a conventional means 20 for attachment of the rocker arm, which, in use, reciprocates the valve stem, described below. Cage 10 also defines a cage fuel inlet 22.

An annular nosepiece 23, defining an upwardly facing annular shoulder 51 is threaded into the lower end of lower tubular portion 10a of the cage, and forms a part thereof. It is secured in place by set screws 19. Alternately, piece 23 may be formed integrally with the rest of the cage.

A second housing, herein normally referred to simply as "the housing," is illustrated at 24. Housing 24 is tubular, being formed in two main pieces, and carries all the working parts and wear parts of the valve. The uppermost of the two main parts of the housing 24 is the main body 26. The interior of body 26 defines the upper part of a central throughway 28, which is generally smooth-sided and of uniform diameter, except for enlargements or counterbores 30 and 32 at its upper and lower ends, respectively. Its exterior configuration includes an annular flange 34 extending radially outwardly from the upper end of an uppermost, large diameter sealing section 36 of housing part 26. Sealing section 36 contains the enlargement 30. Except for the very uppermost portion, including flange 34, sealing section 36 is disposed in the upper tubular portion 10b of cage 10, removably mounted therein by threads 38. Other details of the sealing section 36 and associated parts will be described below in connection with FIG. 2.

Beneath sealing section 36, main housing body 26 has its outer diameter reduced, as indicated at 40, to define a large annular fuel flow space extending downwardly from fuel inlet 22 between the cage 10 and the housing 24. In assembling the housing 24 and the parts carried thereby, an annular bushing 42 is emplaced in the lowermost enlargement or counterbore 32, whereafter the auxiliary housing part 44 is fitted into a further counterbore 46 in the main housing part 26. Part 44 is internally counterbored to receive the lower end of bushing 42, and part 44 serves as the second main part of the housing 24.

Somewhat below bushing 42, auxiliary housing part 44 flares radially outwardly and downwardly, and in this flared section, there are formed several housing fuel inlet ports 48. These ports 48 provide communication between the exterior of the housing 24, and more specifically, the flow space formed between that housing and the cage 10 below inlet 22, and the central throughway 28 of the housing 24.

Below ports 48, auxiliary housing part 44 resumes a generally cylindrical configuration, but of larger diameter. This larger diameter part defines a downwardly facing shoulder 50 sized to land on shoulder 51. A copper gasket 49 is disposed between shoulders 50 and 51 (see FIG. 1A). The large diameter part of housing piece 44 also defines a generally axially directed, frustoconical valve seat 52, which also serves as a fuel outlet from the throughway 28 into the firing chamber of the engine.

A valve stem 54, sized for a running fit within bushing 42, is mounted in the central throughway 28 of the housing 24. At its lower end, valve stem 54 carries the frustoconical valve element 56, which is sized and configured to seat on seat 52. Even though valve element 56 is much larger in diameter than stem 54, and opens beyond throughway 28, i.e. into the firing chamber, rather than opening upwardly into the throughway 28 as is the case with some diesel injectors, the diameter of valve element 56 is nevertheless small enough to allow the entire housing 24, with the valve element 56 and other parts carried thereby, to be inserted and fully seated in cage 10 from the upper end thereof. Housing 24 and the parts carried thereby are likewise removable from the upper end of the cage, so that the cage 10 need not be removed from the engine in order to service the working and/or wear parts of the valve, Rather, the housing 24, and the various parts carried thereby, form a removable, replaceable cartridge. When some part or parts of such a cartridge need service, it can be removed from the engine, and replaced by a spare cartridge, while the old cartridge is sent in for service.

This arrangement affords particular advantages in connection with fuel injection valves handling gaseous fuel such as natural gas. The engines that run on such fuels are typically very large. The cage 10 of an injection valve adequate to inject the quantities of gaseous fuel required for such an engine is also very large. Being a metal casting, it is also correspondingly heavy, and a significant part of this weight is accounted for by the relatively large diameter lower portion 10A, the lugs 14, and the arm 18, none of which typically wear or require servicing. The removable cartridge 24 et al. is much smaller, more convenient to emplace and remove, and less expensive to send in for service, and it is more practical to keep extra cartridges on hand than it would be to keep entire valves. What is more, when one only has to remove the cartridge for service, then it is not necessary to disconnect the rocker arm from the cage arm 18 and its connection 20.

However, this dual housing arrangement creates a second annular locus through which environmentally objectionable gases can theoretically escape: In addition to the locus between the valve stem 54 and the housing 24, there is a locus between the cage 10 and housing 24.

The valve element is biased into its upper, or closed, position against seat 52, and also prevented from dropping out of the housing and into the engine, by a compression coil spring 58 that co-acts between the upper end of housing part 26 and the underside of a ring 60 carried at the upper end of valve stem 54. The upper part of valve stem 54 has its diameter tapered upwardly and radially inwardly to form a frustoconical section 63. Above that, the diameter increases abruptly to form a cylindrical top flange 62 and a shoulder 65 between sections 62 and 63. Ring 60 has its inner diameter tapered radially outwardly and upwardly as indicated at 67. A split keeper 61, having inner and outer tapers matching sections 63 and 76, is wedged between those sections, and abuts shoulder 65, to retain ring 60 on the valve stem 54. A small annular rim 64 extends upwardly from housing part 26 around the open upper end of its throughway 28 to help locate the bottom end of spring 58.

In reference to FIG. 2, in conjunction with FIG. 1, various parts associated with the sealing section 36 of the housing part 26 will now be described. As previously mentioned, housing part 26 is threaded into cage 10 as indicated at 38. It is further secured, e.g. against loosening that could be caused by engine vibration, by a lock screw 66 passing through a radial bore in the upper tubular portion 10b of the cage to abut the side of sealing section 36 of the housing, and by a jam nut 68 on the screw 66.

As previously mentioned, throughway 28 has an uppermost enlargement or counterbore 30. A number of parts are disposed in this counterbore 30. Beginning from the bottom, there is a seal backup ring 70, formed of a synthetic material such as polytetrafluoroethylene. As shown, the cross-sectional configuration of ring 70 is that of a flat-headed chevron. Next is a tapered-headed chevron seal ring 72 of an elastomeric material, such as natural or synthetic rubber. The tapered head of ring 72 is shaped to interfit with the diverging lips of the ring 70. Next is a tapered-headed chevron ring 74, configured much like ring 72, formed of a synthetic material, such as polytetrafluoroethylene. The tapered head of ring 74 is configured to interfit with the lips of ring 72. Next is a spreader ring 76, having a tapered head configured to interfit with the lips of ring 74, and a blunt or flattened upper surface.

Ring 72 serves as the primary inner or lower housing seal, although rings 70 and 74 may also perform some independent sealing function, while further serving to properly pre-position and support the parts of ring 72. Ring 76, in turn, helps to maintain proper positioning of the lips of ring 74. Even though these rings interfit with one another, as previously mentioned, no ring completely fills the pressure receiving concavity formed generally between the lips of the next adjacent seal. It is also to be noted that all of these rings in the lower stack 70–76 have the pressure receiving concavities, e.g. 73, between their lips facing upwardly or outwardly, so that high pressure in the space thereabove will tend to urge the lips of the chevrons more tightly against the valve stem 54 and against sealing section 36 of the housing.

Next in enlargement 30 there is disposed a compression coil spring 78, which serves to space the lower seal stack 70–76 from the upper seal stack, and also to preload both seal stacks. Next is the upper seal stack 80–86, which is a mirror image of the lower one. Thus, it includes a flat-headed chevron-shaped backup ring 86, an elastomeric chevron seal 84, a plastic chevron seal 82, and spreader ring 80. In the upper stack, the chevrons have their concavities facing downwardly so that they too will be tightened by high pressure in the space between the two seal stacks, i.e. the space occupied by spring 78.

Just above the upper seal stack is a spacer ring 88 of hard plastic. Next is the upper bushing 90, which has a running fit against the valve stem 54. Bushing 90 is press-fit into counterbore 30, and thus retains all the other parts in that counterbore. An optional annular dust cover 92 may be emplaced above bushing 90, and the rim 64 may be counterbored as shown to receive it.

Between the two seal stacks of the housing, i.e. in the vicinity of spring 78, a radial bore 94 is formed through sealing section 36 of the housing. This bore serves as the buffer inlet port of the housing. Adjacent the radially outer or upstream end of port 94, a shallow annular distribution groove 96 is machined in the outer surface of the sealing section 36 of the housing. In alternate embodiments, a similar groove could be formed in the inner surface of the upper tubular portion 10b of the cage in addition to, or instead of, groove 96. Communicating with groove 96 is a radial bore 100 through upper tubular section 10b of the cage. This bore 100 serves as the buffer inlet passage of the cage, and its radially outer or upstream end 102 is provided with threads 102 or other suitable formations for connection to an injection nozzle 104.

On opposite sides of the distribution groove 96, and thus on opposite sides of the aligned buffer inlets 94 and 100, sealing section 36 of the housing has a pair of external annular grooves 106 and 108 retaining elastomeric O-rings 110 and 112, respectively.

During use of the valve, nozzle 104 is connected into bore 100, and an inert, nonflammable buffer gas, such as nitrogen, is injected therethrough at a pressure higher than the fuel pressure. As the buffer gas reaches the downstream or radially inner end of bore 100, it is distributed about the entire circumference of the annular locus between the cage and the housing by the distribution groove 96.

Seals 110 and 112 generally maintain the relatively high pressure. However, since all seals leak at least somewhat, this relatively high pressure ensures that any leakage is of buffer gas downwardly or inwardly, as opposed to environmentally objectionable engine gases leaking upwardly or outwardly. Furthermore, any gas that leaks outwardly to atmosphere will be the harmless buffer gas.

An advantageous feature of the invention is the use of fluid pressure responsive seals, such as O-rings 110 and 112, in this annulus. By "fluid pressure responsive," is meant that the seals will flow or otherwise tend to deform, so that the pressure between them actually helps to tighten their sealing ability.

Buffer gas also passes from the groove 96 through bore 94 and into enlargement 30 in the vicinity of spring 78. The radially open nature of spring 78 allows this fluid to pass around the entire circumference, and along both the inner and outer diameters of the space, in much the same manner as occurs in the distribution groove 96. Again, the seals, e.g. 72 and 84, on opposite sides of this space are fluid pressure responsive, in this case having deflectable sealing lips that are urged outwardly into tighter sealing engagement by the pressure of the buffer gas. Again, due to the relatively high pressure of the buffer gas, and the seals that maintain it, any leakage will be leakage of buffer gas inwardly, rather than fuel gas outwardly. Any gas that leaks out to atmosphere from enlargement 30 will be the harmless buffer gas.

It is to be noted that, in some types of valves, both stacks of chevrons might be arranged with their concavities opening downwardly, so as to further resist outward leakage of engine gases. However, in the particular type of valve involved here, it is preferable to minimize the amount of any extraneous gas that leaks into the firing chamber of the engine. Thus, the lower stack of housing seals has been arranged with their concavities facing upwardly, so as to be tightened by the pressure of the buffer gas. This arrangement has been found to work very well.

Indeed, the entire sealing arrangement is not only effective in preventing fugitive emissions from the engine, but somewhat surprisingly, has actually increased the average life of the housing seals (chevrons), so that they do not have to be replaced as often.

Another notable feature of the preferred embodiment of the invention has to do with the combination of the particular type of dual housing valve in which the cage has an upper tubular portion extending above the cage fuel inlet 22 and at least partially surrounding the sealing section 36 of the housing. This allows for a very simple modification in the existing valve design, whereby the buffer inlets 100 and 94 can be simple aligned radial bores, and both can be fed by the single injector 104.

It is also to be noted that, in this valve design, the already existing enlargement 30 is utilized as a sort of distribution groove for the buffer gas at the innermost of the two annular loci to be sealed. Since the housing seal stacks 70–76 and 80–86 are disposed in one and the same counterbore or enlargement 30, a longitudinal spacer is required in the distribution annulus. In this case, it is particularly advantageous to utilize the already existing spring 78 for this purpose, whereby the spring can also pre-load the seal stacks. However, it would also be possible to use other types of radially open annular members, such as lantern rings.

It should also be noted that the particular system of passageways, seals, etc., involved here fits in with the scheme of providing a readily removable cartridge for the valve, which does not require removal of the cage from the engine, nor disconnection of anything but the cartridge from the cage. More specifically, the nozzle 104 can remain connected to the cage at all times, if desired, and a separate valve can simply be used to shut off the flow of nitrogen while the valve cartridge is being changed. Also, the seals 110 and 112 are carried by the housing 24, preserving the advantage of having all replacement parts on the removable cartridge.

Some variations in the preferred embodiment have already been alluded to above, and many others are within the skill of the art. By way of example only, the kinds and numbers of seal rings in the stacks of seal rings could be varied, and individual seals could even be used. For single housing valves, only a single buffer inlet port, similar to 94, would be provided, extending radially or otherwise through the single housing, and its upstream end could be directly adapted for connection to the buffer gas injection nozzle. It is therefore intended that the scope of the invention be limited only by the claims that follow.

I claim:

1. A fuel injection valve for injecting a gaseous fluid into an engine comprising:
   a tubular housing having
      a central throughway;
      an annular, axially directed valve seat defining an outlet from the throughway;
      at least one housing fuel inlet communicating the exterior of the housing with the throughway outwardly of the valve seat;
      a sealing section outwardly of the housing fuel inlet and including an internal annular enlargement in the central throughway, a housing buffer inlet through the housing communicating the exterior of the housing with the enlargement;
   means for communicating a buffer fluid injector with an upstream end of the housing buffer inlet;
   a valve stem mounted for reciprocation in the throughway and having a valve element at an inner end thereof in opposition to the valve seat;
   and first and second annular housing seal means sealing between the valve stem and the housing, respectively inwardly and outwardly of a downstream end of the housing buffer inlet;
   a tubular cage coaxially removably receiving at least a portion of the housing and having
      an open inner end adjacent the valve seat and adapted for receipt in an engine;
      a cage fuel inlet disposed inwardly of the sealing section of the housing;
      and a cage buffer inlet extending through the cage, the cage buffer inlet being communicable with the injector and having a downstream end opening to an annular locus between the exterior of the housing and an interior surface of the cage disposed outwardly of the cage fuel inlet;

at least one of the cage or the housing having an annular distribution groove communicating with said locus and with the downstream end of the cage buffer inlet;

and first and second annular cage seal means sealing between the housing and the cage, respectively inwardly and outwardly of the downstream end of the cage buffer inlet;

the cage and the housing being sized and configured to define a fuel flow space laterally between the interior surface of the cage and the exterior of the housing and longitudinally between the cage fuel inlet and the housing fuel inlet.

2. The device of claim 1 wherein the housing seal means are of a fluid pressure responsive type.

3. The device of claim 2 wherein the cage buffer inlet communicates with the housing buffer inlet, whereby a single such injector can communicate with the enlargement of the housing throughway and with the distribution groove.

4. The device of claim 3 wherein the distribution groove communicates with the upstream end of the housing buffer inlet.

5. The device of claim 3 wherein the first and second cage seal means are of a fluid pressure responsive type.

6. The device of claim 5 wherein each of the housing seal means comprises at least one lip type seal having a pressure receiving concavity defined between deflectable lips.

7. The device of claim 6 wherein the first housing seal means is disposed inwardly of the housing buffer inlet with its concavity facing outwardly, and the second housing seal means is disposed outwardly of the housing buffer inlet with its concavity facing inwardly.

8. The device of claim 7 wherein each of the cage seal means comprises an O-ring disposed in a respective locating groove in the cage or the housing.

9. The device of claim 6, wherein the housing seal means are disposed in the enlargement of the central throughway; and further comprising an annular spacer between the first and second housing seal means, the spacer being adapted to permit fluid distribution from the inner diameter of the enlargement to the outer diameter of the valve stem about the entire circumference.

10. The device of claim 9 wherein the spacer comprises a compression spring pre-loading the housing seal means.

11. The device of claim 5 wherein the cage has an outer tubular portion at least partially surrounding the sealing section of the housing; the downstream end of the cage buffer inlet and the cage seal means being disposed in the outer tubular portion.

12. The device of claim 11 wherein the cage buffer inlet is a radial bore through the outer tubular portion of the cage, and the housing buffer inlet is a radial bore through the sealing section of the housing.

13. The device claim 12 wherein the means for communicating the injector comprises attachment formations associated with the upstream end of the cage buffer inlet.

14. The device of claim 5 wherein: each of the cage seal means is disposed in a respective locating groove in the housing; the valve seat faces away from the throughway, and the valve element opens beyond the seat; and the housing, along with the valve element and valve seat, are sized for removal through an outer end opening of the cage.

15. A method of modifying the sealing system of a fuel injection valve for an engine, the valve being of the type comprising a tubular housing having a central throughway for reciprocably receiving a valve stem, the throughway have an enlarged sealing zone, disposed outwardly of a housing fuel inlet and outlet, the method comprising the steps of:

forming a housing buffer inlet through the housing intermediate the axial extremities of the sealing zone;

emplacing a first annular housing seal means in the sealing zone inwardly of a downstream end of the housing buffer inlet;

emplacing a radially-open, circumferentially-clear, annular spacer in the sealing zone outwardly of the first housing seal means in alignment with the downstream end of the housing buffer inlet;

emplacing a second annular housing seal means in the sealing zone outwardly of the spacer and of the downstream end of the housing buffer inlet;

wherein the valve is of the type further comprising a tubular cage coaxially removably receiving at least a portion of the housing and having a cage fuel inlet disposed inwardly of the sealing zone of the housing throughway, the method further comprising forming a cage buffer inlet in the cage communicating with the housing buffer inlet and with an annular locus between the housing and the cage, outwardly of the fuel cage inlet, whereby a single source of buffer gas can communicate with the sealing zone of the housing throughway and with said locus;

and emplacing first and second cage seal means in said locus on opposite axial sides of a mouth of the cage buffer inlet.

16. The method of claim 15 further comprising the step of injecting an inert, nonflammable buffer gas through the housing buffer inlet at a pressure greater than the fuel pressure.

17. The method of claim 16 comprising so emplacing as at least a part of the first and second housing seal means respective lip-type fluid pressure responsive seals each with a pressure receiving concavity facing axially.

18. The method of claim 17 comprising so emplacing the lip type seals with their concavities facing toward each other, and so emplacing as the spacer a compression spring, thereby pre-loading the housing seal means.

19. The method of claim 15 wherein the cage is of the type having an outer tubular portion at least partially surrounding a sealing section of the housing that encircles the sealing zone of the throughway, the method further comprising:

so forming the housing buffer inlet as a radial bore through the sealing section, and so forming the cage buffer inlet as a radial bore through the outer tubular portion.

20. The method of claim 19 further comprising forming an annular distribution groove in one of the sealing zone or the outer tubular portion in communication with the downstream end of the cage buffer inlet and with the upstream end of the housing buffer inlet and between the cage seal means.

21. The method of claim 19 further comprising forming an annular distribution groove in one of the sealing zone or the outer tubular portion in communication with the downstream end of the cage buffer inlet and between the cage seal means.

22. A method of sealing a fuel injection valve injecting gaseous fuel into an engine, wherein the valve is of the type comprising a tubular housing having an outer housing fuel inlet, an inner housing fuel outlet defined by a valve seat, and a flowway between the housing fuel inlet and the seat, and a valve stem reciprocably mounted in the housing, at least partially in the flowway, and carrying a valve element for cooperation with the seat, the method comprising:

mechanically sealing between the interior of the housing and the exterior of the valve stem in two axially spaced housing seal locations both outwardly of the housing fuel inlet;

injecting an inert, nonflammable gas between the valve stem and the housing, and between the two housing seal locations at a pressure greater than the fuel pressure;

wherein the valve is of the type further comprising a cage at least partially surrounding the housing and having a cage fuel inlet, the method further comprising mechanically sealing between coaxially surrounding and receiving portions of the cage and housing in two axially spaced cage seal locations both outwardly of the cage fuel inlet, and injecting such buffer gas between the housing and cage, and between the two cage seal locations, at such greater pressure;

wherein the buffer gas is so injected between the housing and cage and between the housing and valve stem through a single cage buffer inlet.

* * * * *